United States Patent [19]

Walther

[11] Patent Number: 4,910,694

[45] Date of Patent: Mar. 20, 1990

[54] METHOD FOR APPROXIMATING A VALUE WHICH IS A NONLINEAR FUNCTION OF THE LINEAR AVERAGE OF PIXEL DATA

[76] Inventor: Lawrence E. Walther, 1669 Lake Ave., Rochester, N.Y. 14650

[21] Appl. No.: 142,764

[22] Filed: Jan. 11, 1988

[51] Int. Cl.⁴ .................. G06F 15/62; G06K 9/36; H04N 1/40

[52] U.S. Cl. ..................... 364/581; 364/575; 358/213.17; 358/336; 358/314

[58] Field of Search ............... 364/581, 582, 575, 574, 364/573, 734, 811; 358/36, 163, 213.15, 213.17, 336, 314, 44, 37

[56] References Cited

U.S. PATENT DOCUMENTS

| | | | |
|---|---|---|---|
| 3,737,781 | 6/1973 | Deerkoski | 364/581 |
| 4,242,704 | 12/1980 | Ito et al. | 358/167 |
| 4,454,546 | 6/1984 | Mori | 358/260 |
| 4,463,375 | 7/1984 | Macovski | 358/36 |
| 4,468,704 | 8/1984 | Stoffel et al. | 358/282 |
| 4,642,678 | 2/1987 | Cok | 358/44 |
| 4,649,568 | 3/1987 | Kiesel et al. | 382/41 |
| 4,656,500 | 4/1987 | Mori | 358/260 |
| 4,663,655 | 5/1987 | Freeman | 358/41 |
| 4,774,565 | 9/1988 | Freeman | 358/36 |

*Primary Examiner*—Parshotam S. Lall
*Assistant Examiner*—V. Trans

[57] ABSTRACT

A system for weighting nonlinear, e.g. logarithmic, pixel data as part of a missing pixel interpolation. This is accomplished to generate a weighted average of the logarithmic intensity values for those pixels which surround the missing pixel in order to approximate the logarithm of the linear average of these pixel values. Two weighting coefficients of unequal value are selected so that their sum equals the quantity one. The larger of the logarithmic values is weighted by multiplying the larger logarithmic pixel value by the larger weighting coefficient, and then by adding to this quantity the smaller logarithmic pixel value which has been multiplied by the smaller weighting coefficient. The result is a weighted logarithmic average which approximates the log of the linear average.

14 Claims, 2 Drawing Sheets

METHOD FOR APPROXIMATING A VALUE WHICH IS A NONLINEAR FUNCTION OF THE LINEAR AVERAGE OF PIXEL DATA

TECHNICAL FIELD

The present invention pertains to a method for approximating a value which is a nonlinear function of the linear average of video pixel data; and in an exemplary embodiment, to apparatus and method for weighting logarithmic pixel values, as part of an interpolation scheme for missing pixels, so that their average more closely approximates the log of an average of their linear equivalents.

BACKGROUND OF THE INVENTION

In some video devices which utilize a single semiconductor image sensor, the image is passed through a color filter array prior to reaching the sensor. Depending upon the configuration of the filter array, a pattern of red, green and blue pixels may be established. For example, a line of pixels output from the imager may have the following pattern: GGGRGGGBGGG . . . , where G, R, and B represent green, red and blue pixels. A discussion of missing pixels associated with the use of a color filter array in combination with a single sensor is set forth in further detail in U.S. Pat. No. 4,663,661 by Weldy, et al, which is assigned to the assignee of the present invention, and which is incorporated herein by reference.

In a missing pixel interpolation scheme, informaton from neighboring pixels is often used as an approximation for the value of the missing pixel. For example, in the aforementioned imager output of GGGRGGG . . . , it is apparent that a green pixel is missing from the fourth pixel position from the left. One method of providing an estimate of the missing green pixel value is to compute an arithmetic average of the linear values of the green pixels which neighbor to the left and right of the missing green pixel.

However, it is sometimes the case that the pixel signals output from the imager are first converted into a nonlinear form, such as logarithmic form, and then averaged as part of a missing pixel interpolation. It has been found that averaging the logarithmic equivalents of these pixel values is unsatisfactory for missing pixel interpolation. More specifically, as the difference in intensities between the pixels which neighbor the missing pixel increases, the greater the deviation of their logarithmic average from the log of their linear average.

One possible solution to this problem is to convert these logarithmic values back into their previous linear form, and then compute their average. This particular method is unsatisfactory, however, because of the additional effort necessary to reconvert the values into linear form for averaging, and then reconvert them back into logarithmic form for further downstream processing.

SUMMARY OF THE INVENTION

The present invention pertains to apparatus and methods for averaging two or more signal values which are in a nonlinear form. This is achieved by first receiving first and second nonlinear signal outputs, and then determining a difference between the level of the first signal output and the level of the second signal output. The method further includes generating a weighted average of the nonlinear first and second outputs by changing an unweighted average of the first and second inputs by an amount which is a function of the difference between the levels of the first and second signal outputs.

In an exemplary embodiment there is provided a method for computing the average of two logarithmic pixel intensity values in a manner that the average of their logarithmic values more closely approximates the log of the average of their linear values.

BRIEF DESCRIPTION OF THE DRAWINGS

These and other objects and advantages of the present invention will become more readily apparent upon reading the following detailed description in conjunction with the attached drawings, in which.

DETAILED DESCRIPTION

The present invention pertains to a system for weighting nonlinear values of pixel intensity data so that their weighted average more closely approximates the result achieved when calculating the log of the average of the linear equivalents of this pixel data.

Figure 1:
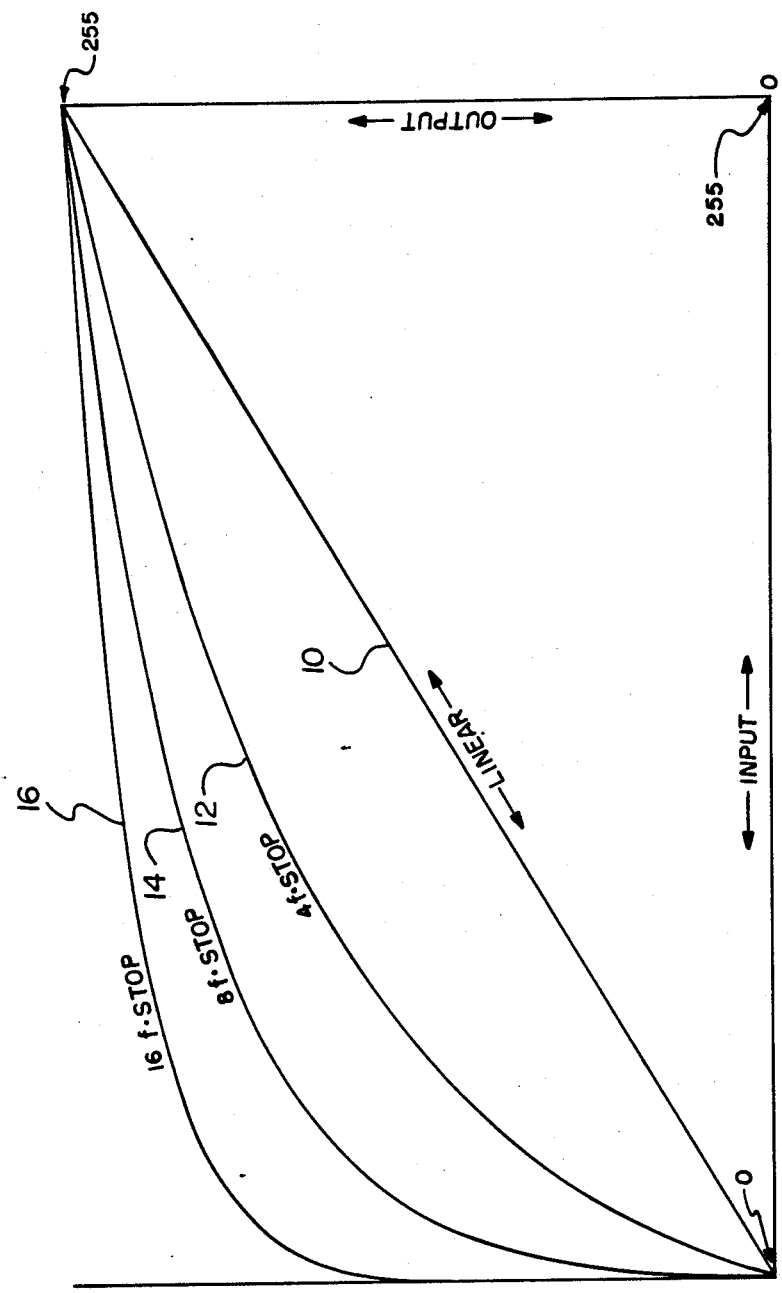
FIG. 1 is a graph of a scaled log output as a function of a scaled pixel intensity input when utilizing logarithmic amplifiers having dynamic ranges which vary between one f-stop and sixteen f-stops.

In conventional imaging systems, it is not uncommon to convert image data which is in a linear form into a nonlinear form in order to process the data and to achieve image enhancement. This conversion typically involves "expanding" the image data level at the lower intensities so that a small change in the data at the input generates a much larger change at the output. Whereas the image data at the higher intensities is "compressed" so that the same change in the image intensity data at the input generates a smaller change at the output. This can be explained in further detail by referring to FIG. 1 which shows a curve identified by the number 10 which represents an image signal output which is a linear function of an image signal input. Also shown are curves identified by the numbers 12, 14, and 16 which represent image signal outputs which are nonlinear functions of the inputs. More specifically, these outputs have resulted from conversion of the image data from the linear form to a nonlinear form. This conversion is characterized by expansion of the scale along the y-axis occurring at the low intensity end (toward the left side of the x-axis) and compression of the scale along the y-axis occurring at the high intensity end (toward the right side of the x-axis) over dynamic ranges of 4, 8 and 16 f-stops, i.e. octaves. It should be apparent from FIG. 1, that as the dynamic range increases (increasing f-stop), greater expansion along the y-axis occurs at the low input values, and greater compression occurs along the y-axis at the higher input values.

In a preferred embodiment, this linear-to-nonlinear conversion has been accomplished in a conventional manner by means of a logarithmic (base ten) transfer function. However, other nonlinear transfer functions also may be used, such as a power function whereby the image input data is normalized to a scale between zero and one, and the output is generated by raising the input data to a power between zero and one.

As discussed somewhat in the Background of the Invention, a conventional method of estimating the value of a missing pixel color, e.g. missing green pixel, is to add the linear values of the (neighboring) pixels which are located at either side of the missing pixel, and then to divide this sum by two to obtain their average. Typically, this linear average then might be converted into a nonlinear form, such as log value, for further downstream signal processing.

Figure 2:
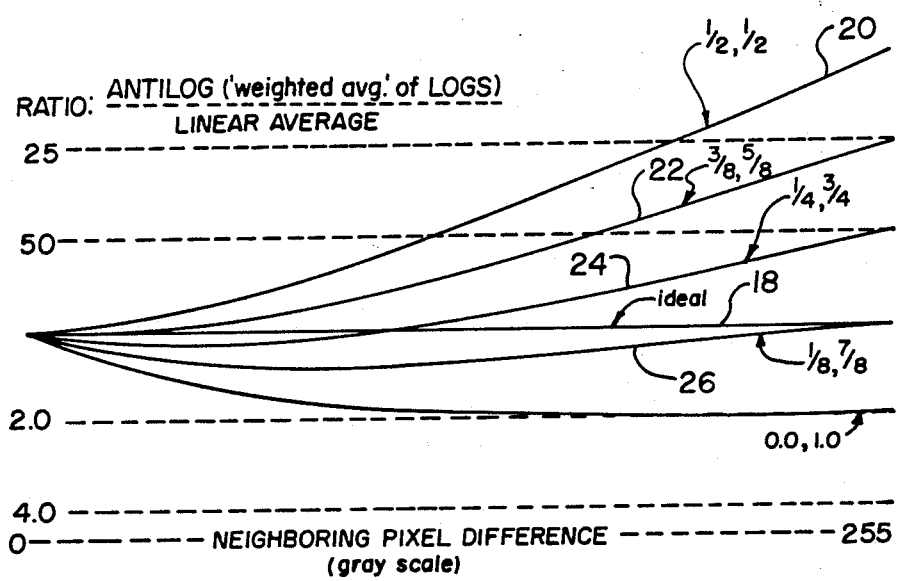
FIG. 2 is a graph of the antilog of a weighted average of logarithmic pixel values divided by linear average of these pixel values, as a function of the difference between the pixel values, for curves representing different weighting coefficients.

However, it may be the case where it is desirable to perform the missing pixel interpolation after the image signals have been converted to their logarithmic equivalents. This had been found to be unsatisfactory because it produces a deviation in the image signal output. More specifically, there is an increase in the deviation of the average of the log intensity values from that of the log of the average of the linear intensity values as the difference in intensities between neighboring pixels increases. That is, as the difference in intensities between neighboring pixels increases, the average of the log intensities becomes smaller relative to the log of average of the linear intensities. This may be explained in greater detail by reference to FIG. 2 which is a graph of (i) the ratio of the "antilog of the weighted average of neighboring pixel values in logarithmic form (LOGS)" to the "linear average" of these pixel values, as a function of (ii) the difference in values between the neighboring pixels in log form. In FIG. 2, a horizontal reference line, designated by the number 18, is established for the average of the linear pixel values as a function of the difference in intensities between pixels which neighbor the missing pixel. Furthermore, a curve designated by the number 20 represents an unweighted average (since equal coefficients of 0.5, 0.5 are used) of the pixel intensity values in log form which neighbor a missing green pixel. As the difference between pixel intensity values increases from 0 to 255, the ratio of the "antilog of the weighted average of the LOGS" to their "linear average" decreases.

However, in the present invention it has been found that by weighting the logarithmic values of the neighboring left and right pixels prior to their being averaged (reflected by the curves 22, 24 and 26 in FIG. 2), these weighted averages of the log values can be made to more closely approximate the ideal log of the linear average. This is accomplished by utilizing weighting coefficients which effectively increase the unweighted log average by an amount which is proportional to the difference in intensities between the logs of the neighboring pixels. The resulting effect is to move curve 20 downward toward the ideal (curve 18) at the locations occupied by curves 22, 24 or 26, depending upon the particular weighting coefficients selected.

In order to accomplish this weighting of the log average intensities, two weighting coefficients ($C_s$, $C_L$) are chosen; $C_s$ and $C_L$ being of unequal value but their sum equalling the quantity one. Furthermore, the larger coefficient $C_L$ is used to weight the larger of the two log intensity values, while the smaller coefficient $C_s$ is used to weight the smaller log intensity value.

More specifically, the smaller coefficient $C_s$ is chosen so that $C_s$ is greater than zero and less than $\frac{1}{2}$. Likewise the larger coefficient $C_L$ is chosen so that $C_L$ is greater than $\frac{1}{2}$ and less than one. This selection is accomplished in the present invention by first comparing the logs of pixel intensity values A and B to determine which is larger. In an exemplary embodiment the letters A and B represent the linear intensity values for the two pixels which neighbor a missing green pixel of an imager output which is generated in the manner set forth in the aforementioned U.S. Pat. No. 4,663,661. More precisely then, if log A is greater than or equal to log B, then the weighted average of log A and log B $= (C_L)(\log A) + (C_s)(\log B)$. On the other hand, if it is determined that log B is greater than or equal to log A, then the weighted log average $= (C_s)(\log A) + (C_L)(\log B)$.

In a further exemplary embodiment of the present invention, the intensity data output from the image sensor are converted to their logarithmic form by means of a 49 db (2.45 decade = 8 octave) log amplifier (not shown), the output of which is digitized into eight data bits.

Figure 3:
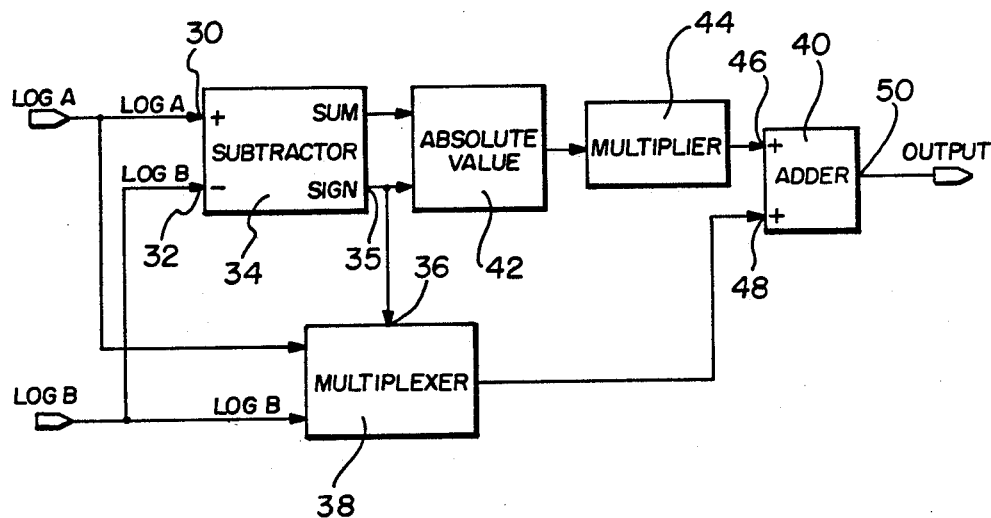
FIG. 3 is simplified block diagram of a system for calculating a weighted average of the logarithmic values in accordance with the present invention.

The output from this 49 dB log amp is then fed to a weighting coefficient circuit shown in FIG. 3. Various weighting coefficients can be utilized as reflected by FIG. 2, including coefficients of $\frac{3}{8}$ and $\frac{5}{8}$ which are represented by the curve 22; weighting coefficients of $\frac{1}{4}$ and $\frac{3}{4}$ which are represented in FIG. 2 by the curve 24; and weighting coefficients of $\frac{1}{8}$ and $\frac{7}{8}$ which are represented by the curve 26. As can be seen by the curves in FIG. 2, the weighting coefficients $\frac{1}{4}$, $\frac{3}{4}$ are optimum when using a 49 dB log amplifier because the weighted average of the LOGS of A and B most closely approximates the log of the average of the linear intensity values (curve 18), particularly at the left side of the graph where the differences in neighboring pixel intensities are lower, and thus are more commonly encountered.

Referring to the block diagram of the weighting circuit shown in FIG. 3, the values of log A and log B are output from the upstream log amp and then fed to inputs 30, 32 of a conventional subtractor 34. If log A is determined to be greater than log B, for example, then a sign output 35 of the subtractor is positive, which in turn is fed to the select input 36 of a multiplexer 38. In response to this positive input, the multiplexer 38, which has inputs of log A and log B, switches the log A value to a downstream adder 40.

In addition, the difference output (log A − log B) from the subtracter 34 is fed downstream to an absolute value circuit 42 with the resulting absolute value of the difference being fed further downstream to a conventional multiplier 44 which is configured in a conventional manner to multiply the absolute value input by an exemplary value of $-\frac{1}{4}$. The resulting product, $-\frac{1}{4}(|\log A - \log B|)$, is then added to the output from the multiplexer 38 to generate the weighted logarithmic average.

More specifically, in the exemplary case where log A is greater than log B, an input 46 from the multiplier 44 to the adder 40 has the value "$(-\frac{1}{4})(\log A - \log B)$"; whereas the other input 48 to the adder has the value "log A" which is received from the multiplexer 38. In this manner, the output 50 from the adder 40 equals $$(\log A) - (\tfrac{1}{4})(\log A - \log B),$$

which in turn equals the weighted logarithmic average $$\tfrac{3}{4} \log A + \tfrac{1}{4} \log B.$$

On the other hand, if log B is determined to be greater than log A at subtractor 34, then the sign output of subtractor 34 is negative. This negative input which is fed to the multiplexer 38 causes the log B input to the multiplexer to be switched to the downstream adder 40.

In addition the difference output (log A−log B) from the subtractor is fed to the absolute value circuit 42, which outputs the absolute value of this difference output as the quantity log B−log A (because log B is greater than log A). When this quantity is fed to the multiplier 44, the output therefrom is the quantity $$(-\tfrac{1}{4})(\log B - \log A).$$

When this quantity is added to log B at the adder 40, the output therefrom is equal to the quantity $$\log B - (\tfrac{1}{4})(\log B - \log A),$$

which in turn equals the weighted logarithmic average $$\tfrac{3}{4} \log B + \tfrac{1}{4} \log A.$$

This weighted logarithmic average is then used to generate the interpolated missing pixel value.

Having described the implementation of an exemplary embodiment of the present invention, a description of the derivation of the aforementioned log averaging technique will be provided. First it is desirable to normalize the 8 bit digital output of the log amp to a scale ranging between 0 and 255. This can be accomplished by means of a log scaling function "LOG", wherein $$\text{LOG Out} = 255(\log(((2^n-1)/255)\text{In}+1)/\log 2^n) \quad \text{Eq. 1,}$$

where In is an 8 bit linear input ranging from 0 to 255 which has been normalized from image values ranging between $\tfrac{1}{2}^n$ and 1, and n is the dynamic range of the log amplifier in octaves (f-stops).

In order to compare the linear averages with the log averages of pixel intensity data, the following table was completed.

TABLE 1

| 1 | 2 | 3 | 4 | 5 (LOGA + LOGB)/2 | 6 LOG((A+B)/2) | Row |
|---|---|---|---|---|---|---|
| A | B | LOGA | LOGB | | | |
| 0 | 0 | 0 | 0 | 0 | 0 | 1 |
| 128 | 128 | 128 | 223 | 223 | 223 | 2 |
| 255 | 255 | 255 | 255 | 225 | 225 | 3 |
| 0 | 255 | 0 | 255 | 127.5 | 223.3 | 4 |
| 255 | 0 | 255 | 0 | 127.5 | 223.3 | 5 |
| 10 | 50 | 110.3 | 180.8 | 145.6 | 157.9 | 6 |
| 210 | 250 | 246.1 | 254.1 | 250 | 250 | 7 |

Analyzing the data in Table 1 it can be seen that when the pixel intensity values A and B are equal (as reflected in rows 1 through 3), then the average of the LOGS of A and B (column 5) is equal to the LOG of the linear average of A and B (Column 6). In the present description the term "LOG" refers to the scaled log value obtained from equation 1. However, rows 4 and 5 show that this equality does not hold true when A and B are unequal. Furthermore, as shown in Table 1, the average of the LOG values is always less than or equal to the LOG of their linear average. Another method of expressing this relationship is by the equation $$\text{LOG} ((A+B)/2) = (\text{LOG} A + \text{LOG} B)/2 + \text{ERROR} \quad \text{Eq. 2,}$$

or $$\text{ERROR} = \text{LOG}((A+B)/2) - (\text{LOG} A + \text{LOG} B)/2 \quad \text{Eq. 3.}$$

It may be further observed in Table 1 that the deviation, referred to herein as ERROR, between the LOG of the linear average of A and B and the average of the LOGS of A and B, increases as the absolute difference between A and B increases. In other words, ERROR is a function of the difference between the logs of the pixel values A and B. Another way of expressing this is by the equation $$\text{ERROR} \approx K(|\text{LOG} A - \text{LOG} B|) \quad \text{Eq. 4,}$$

where K is a constant of proportionality.

For example, in column 5, rows 4 and 5 of Table 1 it can be seen that $$(\text{LOG} A + \text{LOG} B)/2 = (\text{LOG} 255 + \text{LOG} 0)/2 = 127.5,$$

and from column 6 that $$\text{LOG} ((A+B)/2) = \text{LOG} ((255+0)/2) = 223.3$$

Plugging these values into Equations 3 and 4, then $$\text{ERROR} = (223.3 - 127.5) = 95.8 = (K)(255 - 0).$$

Therefore $K = 95.8/255 = 0.376 = \tfrac{3}{8}$.

By substitution into Equation 2, it can be seen from the following Equation 5 that $$\text{LOG} ((A+B)/2) = (\text{LOG} A + \text{LOG} B)/2 + (\tfrac{3}{8})(|\text{LOG} A - \text{LOG} B|).$$

Since the term "|LOG A−LOG B|" is a discontinous function, when A is greater than B, then Equation 5 may be expressed as $$\text{LOG} ((A+B)/2) = (\text{LOG} A + \text{LOG} B)/2 + (\tfrac{3}{8})(\text{LOG} A - \text{LOG} B).$$

By simplification, then $$\text{LOG} ((A+B)/2) = ((\tfrac{1}{2}) + (\tfrac{3}{8}))\text{LOG} A + ((\tfrac{1}{2}) - (\tfrac{3}{8}))(\text{LOG} B),$$

which equals $$\tfrac{7}{8} \text{LOG} A + \tfrac{1}{8} \text{LOG} B;$$

where the values $\tfrac{7}{8}$ and $\tfrac{1}{8}$ represent the aforementioned weighting coefficients.

On the other hand if B is greater than A, then Equation 5 may be expressed as $$\text{LOG} ((A+B)/2) \approx \tfrac{7}{8} \text{LOG} B + \tfrac{1}{8} \text{LOG} A.$$

Although the coefficients $\tfrac{7}{8}$, $\tfrac{1}{8}$ provide a LOG Out which is a better approximation of the log of the linear average when the difference between the pixel values is toward the higher (255) values, it is preferable to use the coefficients $\tfrac{3}{4}$, $\tfrac{1}{4}$ mentioned previously which provide a better approximation of the log of the linear average at the lower neighboring pixel differences.

It is a characteristic of image enhancement when image data is converted into a nonlinear form, that as the dynamic range of the log amp increases, the deviation of the unweighted log average from the log of the linear average also increases. In accordance with the present invention, this deviation is best minimized by increasing the difference between the weighting coefficients. For example, this may be accomplished by changing coefficients ¾, ¼, e.g. (¾−¼=½), to coefficients ⅞, ⅛, e.g. (⅞−⅛=¾).

With regard to the log amplifier dynamic range, if n=the number of octaves (f-stops) of dynamic range of the log amp, then the maximum input of the amplifier divided by its minimum input is equal to $2^n$. Therefore, utilizing a log amp having a dynamic range of 16 f-stops, then LOG Out=255((log (257(In)+1))/(log $2^{16}$)), where In is a normalized linear digital intensity value between 0 and 255 which is represents a range between $1/(2^{16})$ and 1, and LOG OUT is a normalized logarithmic digital value between 0 and 255 which represents a range between $\log_{10} (\frac{1}{2}^{16})$ and $\log_{10} (1)$.

When the log of the linear average (LOG (A+B)/2)) is equal to 239.1, for example, then the average of the log values is equal to 127.5. This results in an ERROR of 111.6. Thus, K=111.6/255=7/16, and

LOG ((A+B)/2)≅15/16 LOG A+1/16 LOG B, when A is greater than B; whereas

LOG ((A+B)/2)≅15/16 LOG B+1/16 LOG A, when B is greater than A.

What is claimed is:

1. In an imaging system having image signal inputs and image signal outputs, a method of averaging first and second image signal outputs corresponding to first and second different pixels of an image in order to approximate a third image signal output corresponding to a third different pixel of the image, the method comprising the steps of:
   a. receiving the first and second image signal outputs wherein said first and second image signal outputs vary from their respective first and second image signal inputs in a nonlinear manner so that at lower levels of the image signal inputs a change in the levels of the image signal inputs generates a first change in the levels of the image signal outputs, and at higher levels of the image signal inputs, a corresponding change in the levels of the image signal inputs generates a second change in the levels of the image signal outputs which is difference from the first change;
   b. determining a difference between the level of the first image signal output and the level of the second image signal output; and
   c. generating a weighted average of the nonlinear first and second image signal outputs in order to approximate said third image signal output from an average of the first and second image signal inputs by changing an unweighted average of the first and second image signal outputs by an amount which is a function of the difference between the levels of the first and second image signal outputs.

2. The method as set forth in claim 1 wherein:
   a. the first change in the levels of the first and second signal outputs is greater than the second change; and
   b. the unweighted average of the first and second signal outputs is increased.

3. The method as set forth in claim 1 wherein the unweighted average is increased by an amount which is proportional to the difference between the levels of the first and second signal outputs.

4. The method as set forth in claim 1 wherein:
   a. the unweighted average of the first and second signal outputs is an average of the logarithms of the first and second signal outputs; and
   b. the average of the first and second signal inputs is a logarithm of the average of the first and second signal inputs.

5. The method as set forth in claim 1 wherein the generating step is accomplished by:
   a. generating a first weighting coefficient X and a second weighting coefficient Y in a manner that X is greater than Y;
   b. determining the larger and smaller of the nonlinear first and second signal outputs;
   c. multiplying (i) the larger of the first and second signal outputs by the X coefficient to generate a first weighted output, and (ii) the smaller of the nonlinear first and second signal levels by the Y coefficient to generate a second weighted output; and
   d. combining the first and second weighted outputs to generate the weighted average.

6. The method as set forth in claim 1 wherein:
   a. during the receiving step the first and second signal outputs are generated by a nonlinear amplifier having a dynamic range; and
   b. the generating step includes the steps of:
      (1) determining a difference X-Y between the weighting coefficients, and
      (2) selecting the weighting coefficients X and Y so that the difference X-Y is a function of the dynamic range of the nonlinear amplifier.

7. The method as set forth in claim 6 wherein during the generating step the coefficients X and Y are selected so that at greater dynamic ranges of the nonlinear amplifier, the difference X-Y is greater.

8. The method as set forth in claim 7 wherein during the generating step the first weighting coefficient is selected so that ½<X<1, and the second weighting coefficient is selected so that 0<Y<½, and further wherein the sum of X and Y is equal to one.

9. The method as set forth in claim 8 wherein the generating and multiplying steps are accomplished by:
   a. determining an absolute value difference between the first and second signal output levels;
   b. multiplying the absolute value difference by a selected weighting factor which is greater than 0 and less than ½ to generate a third output; and
   c. subtracting the third output from the larger of the first and second signal output levels to generate the weighted average.

10. The method as set forth in claim 9 wherein:
   a. the selected weighting factor is −1/Z;
   b. the third output equals −(1/Z)(|log A−log B|), where log A is the value of the first signal level and log B is the value of the second signal level;
   c. when log A is greater than log B, the weighted average equals the sum of the third output and log A, which in turn is equal to log A−1/Z(|log A−log B|); and
   d. when log B is greater than log A, the weighted average equals the sum of the third output and log B, which in turn is equal to log $B - 1/Z(|\log B - \log A|)$.

11. The method as set forth in claim 10 wherein:

a. during the receiving step the first and second signal levels are received from a logarithmic amplifier having a dynamic range of about 8 octaves: and b. Z is equal to 4.

12. A method for estimating missing color pixel information from nonmissing color pixel information which is output from an image sensor, the method comprising the steps of:

a. receiving image pixel date from the image sensor which represents levels of primary colors and which has a missing color pixel, the image pixel data being in a logarithmic format;

b. selecting data representing logarithmic levels of first and second different nonmissing image pixels from the image pixel data, the first and second logarithmic pixel data representing a primary color which is missing from the missing color pixel data;

c. generating a first weighting coefficient X wherein $\frac{1}{2}<x<1$, and a second weighting coefficient Y wherein $0<Y<\frac{1}{2}$, and further wherein the sum of X and Y is substantially equal to one;

d. determining the larger and smaller of the first and second logarithmic pixel levels;

e. multiplying (i) the larger of the logarithmic first and second pixel levels by the x coefficient to generate a first output, and (ii) the smaller of the first and second pixel levels by the X coefficient to generate a second output; and f. combining the first and second outputs to generate an output which is the estimate of the missing color pixel information.

13. The method as set forth in claim 12 wherein the correction term increases as the difference between the first and second image signal levels increases.

14. The method as set forth in claim 13 wherein the correction term is defined by the equation $(1/Z)(|\log A - \log B|)$, where A represents the first image signal level, B represents the second image signal level, and Z is greater than two.

* * * * *

UNITED STATES PATENT AND TRADEMARK OFFICE
CERTIFICATE OF CORRECTION

PATENT NO. : 4,910,694
DATED : March 20, 1990
INVENTOR(S) : Lawrence E. Walther

It is certified that error appears in the above-identified patent and that said Letters Patent is hereby corrected as shown below:

On the Cover page - Assignee: Eastman Kodak Company, Rochester, N.Y.

On the Cover page - Attorney, Agent, Firm - James A. Smith

Signed and Sealed this

Thirtieth Day of April, 1991

Attest:

HARRY F. MANBECK, JR.

Attesting Officer

Commissioner of Patents and Trademarks